(12) United States Patent
Platner

(10) Patent No.: US 6,533,299 B2
(45) Date of Patent: Mar. 18, 2003

(54) DRIVE AXLE AIR SUSPENSION

(75) Inventor: David K. Platner, Shelby, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 37 days.

(21) Appl. No.: 09/725,421

(22) Filed: Nov. 29, 2000

(65) Prior Publication Data

US 2002/0063407 A1 May 30, 2002

(51) Int. Cl.$^7$ .................................................. B60G 3/00
(52) U.S. Cl. .............. 280/124.1; 280/686; 280/124.107
(58) Field of Search .................... 280/124.11, 124.116, 280/124.157, 678, 683, 124.106, 124.107, 124.1; 180/349, 352, 378; 267/256

(56) References Cited

U.S. PATENT DOCUMENTS

| | | | | |
|---|---|---|---|---|
| 4,596,299 A | * | 6/1986 | Krude | 180/73.2 |
| 4,733,876 A | * | 3/1988 | Heider et al. | 280/6 H |
| 4,946,189 A | * | 8/1990 | Manning | 280/688 |
| 5,346,247 A | * | 9/1994 | Snyder | 280/712 |
| 5,362,095 A | * | 11/1994 | Eveley | 280/712 |
| 5,366,035 A | * | 11/1994 | Hayashida et al. | 180/24.01 |
| 5,366,238 A | * | 11/1994 | Stephens | 280/712 |
| 5,524,921 A | * | 6/1996 | Ellingsen | 280/713 |
| 5,564,521 A | * | 10/1996 | Mclaughlin et al. | 180/352 |
| 6,267,526 B1 | * | 7/2001 | Mclaughlin | 403/150 |

FOREIGN PATENT DOCUMENTS

| | | | | |
|---|---|---|---|---|
| JP | 402254085 A | * | 10/1990 | 280/124.116 |
| JP | 403227709 A | * | 10/1991 | 280/124.116 |
| JP | 405185814 A | * | 7/1993 | 280/124.116 |

* cited by examiner

Primary Examiner—Paul N. Dickson
Assistant Examiner—Kelly E Campbell
(74) Attorney, Agent, or Firm—Carlson, Gaskey & Olds

(57) ABSTRACT

A lightweight vehicle suspension which is particularly useful for a drive axle uses V-shaped suspension members mounted vertically above the drive axle. The V-shaped members are pivotally connected to the vehicle frame, and an apex of the a-shape is connected at a ball joint to the axle. A lower connecting rod set is also mounted beneath the drive axle. Preferably, there are two of the V-shaped members above the axle and two of the connecting rods below the axle. The overall combination provides a lightweight suspension system that will resist all forces on the axle.

6 Claims, 1 Drawing Sheet

DRIVE AXLE AIR SUSPENSION

BACKGROUND OF THE INVENTION

This invention relates to a lightweight drive axle air suspension system utilizing V-shaped frame members.

Vehicle suspensions are utilized to provide a smooth ride to a vehicle, and for supporting the axles on the vehicle. There are numerous types of suspensions, but in general, each has a goal to resist and accommodate the forces which are seen by the axles during travel. Thus, the suspensions need to resist braking and acceleration forces as well as lateral forces.

One type of known suspension utilizes a parallelogram type mounting. Parallelogram suspensions are often provided with a trailing arm suspension that also mounts an airbag to resist movement of the axle relative to a vehicle frame. In general, the prior art requires large heavy suspension components, and thus it would be desirable to provide a more lightweight suspension system.

SUMMARY OF THE INVENTION

In the disclosed embodiment of this invention, a drive axle is mounted to a vehicle frame through a suspension that provides a parallelogram connection with relatively lightweight members. V-shaped frame members are provided on at least one lateral side of the drive axle to resist lateral forces. More preferably, the V-shaped frame member is positioned above the drive axle, and preferably on both lateral sides of the drive axle. The apex of the V is connected to the drive axle through a ball joint, and the legs of the V are pivotally connected to the vehicle frame.

At the same time, a lower connecting rod is pivotally connected to both the axle and to the vehicle frame on the opposed side of the drive axle. The resulting arrangement provides a very lightweight parallelogram connection. The inventive arrangement resists all forces typically seen by the suspension. In addition, the airbag is mounted on an opposed axial direction relative to the parallelogram suspension components. The lower rod is preferably pivotally connected to a bracket that mounts both the airbag and the lower connecting rod.

These and other features of the present invention can be best understood from the following specification and drawings, the following of which is a brief description.

DETAILED DESCRIPTION OF A PREFERRED EMBODIMENT

Figure 1:
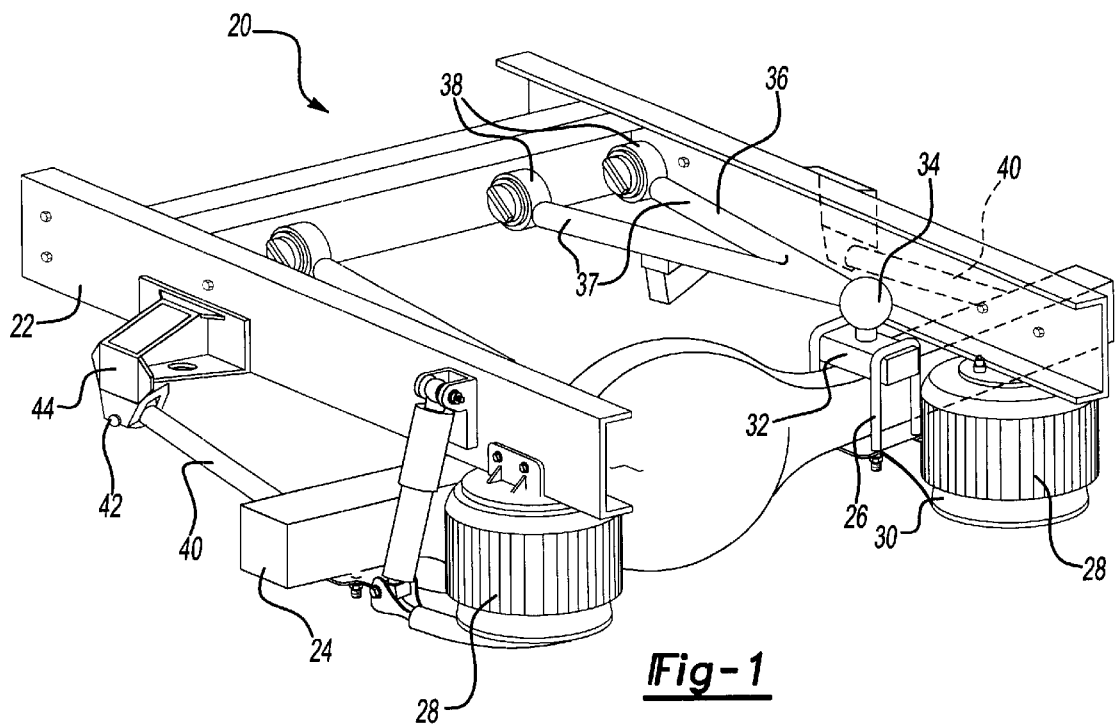
FIG. 1 is a perspective view of an inventive suspension.

A vehicle suspension 20 is illustrated in FIG. 1 having a vehicle frame 22 mounted to a drive axle 24. As shown, u-shaped bolts 26 secure the drive axle to the frame, and to airbags 28. The airbags 28 are connected at an upper end to the vehicle frame 22 and at a lower end to a bracket 30 which is connected by the u-bolt 26 to the drive axle 24. As shown, an upper plate 32 is also connected by the u-shaped bolts 26, and is connected at 34 through a ball joint to an V-shaped rod 36. The V-shaped rod 36 has a pair of legs 37 extending to pivot mounts 38 to the frame 22. The pivot mounts 28 are preferably rubber mounts. Lower connecting rods 40 are pivotally connected at 42 to a frame bracket 44.

Figure 2:
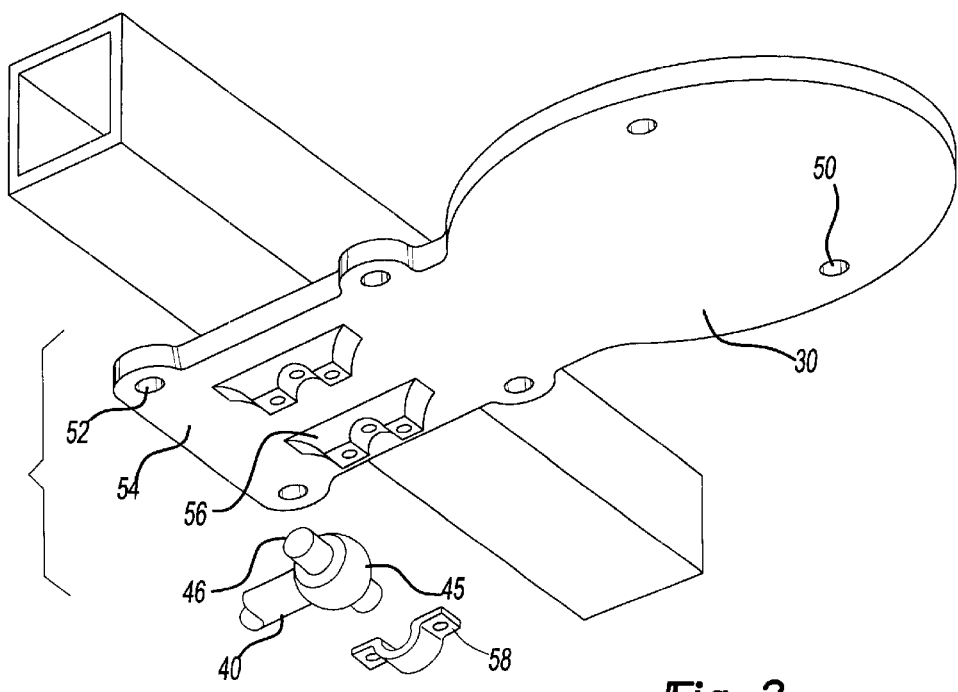
FIG. 2 shows a bottom view of suspension components.

As shown in FIG. 2, a forward end 45 of the arm 40 is pivotally connected at 46 to the underside of the bracket 30. As shown, a forward portion 50 of the bracket 30 mounts the airbag 28 while a rear portion 54 is provided as holes such as 52, for receiving the bolts from the unshaped bolt 26. As shown, mount structures 56 and caps 58 pivotally connect the ears 46 of the arm 40 to provide the pivotal connection. The connection may preferably be a Lemforder style rubber connection. The connection can be bolted in or simply captured by the caps.

The above-described invention provides lightweight members which guide and support the drive axle. The linkages resist torsional housing loads by differential loading of the upper and lower and forward and rear connections. Lateral forces are reacted to by the V-shaped rods 36. The overall suspension provides a parallelogram action to provide adequate support.

A preferred embodiment of this invention has been disclosed, however, a worker in this art would recognize that many modifications would come within the scope of this invention. For that reason the following claims should be studied to determine the true scope and content of this invention.

What is claimed is:

1. A vehicle suspension comprising:
   an axial defining an axial position and extending between two lateral sides, said axle having a vertically upper and a vertically lower surface;
   a first set of support rods including a pair of laterally spaced V-shaped rods each connected through a universal connection to one of said upper and lower surfaces of said axle, and having an V-shape with the apex of the V-shape connected to said axle at said universal connection and the legs of said V-shape being pivotally connected to a vehicle frame, and a second set of rods connecting on the other of said upper and lower surface of said drive axle and pivotally connected to both' said drive axle and to a vehicle frame.

2. A suspension as set forth in claim 1, wherein said V-shaped rod is mounted vertically above said axle.

3. A suspension as set forth in claim 1, wherein said axle is a drive axle.

4. A suspension as set forth in claim 1, wherein said second set of support rods is pivotally connected to a bracket which also mounts an airbag on an opposed axial side of said axle from said support rods.

5. A suspension as set forth in claims 4, wherein said bracket includes a mount surface for pivotally receiving said rod, and caps secure said rod to said surface.

6. A vehicle suspension comprising:
   an axle defining an axial position and extending between two lateral sides, said axle having a vertically upper and a vertically lower surface;
   a first set of laterally spaced V-shaped support rods mounted vertically above said axle, said V-shaped support rods each having an apex connected to said axle at a universal connection, and legs of said V-shaped rods being pivotally connected to a vehicle frame; and
   a second set of arms mounted vertically below said axle, and connected through a pivot connection to both said vehicle frame and to said axle, said second set of arms being connected to a bracket which also mounts an air bag on an opposed axial side of said axle from said second set of arms.

* * * * *